US012679222B2

(12) United States Patent
Isami et al.

(10) Patent No.: US 12,679,222 B2
(45) Date of Patent: Jul. 14, 2026

(54) BATTERY ELECTRIC VEHICLE

(71) Applicant: TOYOTA JIDOSHA KABUSHIKI KAISHA, Toyota (JP)

(72) Inventors: Yoichiro Isami, Mishima (JP); Kenji Mizutani, Toyota (JP); Hirotaka Ikegami, Toyota (JP); Akihito Yasue, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 65 days.

(21) Appl. No.: 18/415,236

(22) Filed: Jan. 17, 2024

(65) Prior Publication Data

US 2024/0253476 A1     Aug. 1, 2024

(30) Foreign Application Priority Data

Jan. 26, 2023     (JP) .................................. 2023-010408

(51) Int. Cl.
   B60L 15/30     (2006.01)
   B60K 31/00     (2006.01)
   B60L 50/60     (2019.01)

(52) U.S. Cl.
   CPC .............. B60L 15/30 (2013.01); B60K 31/00 (2013.01); B60L 50/60 (2019.02);
              (Continued)

(58) Field of Classification Search
   CPC ...... B60L 15/30; B60L 50/60; B60L 2240/12;
              B60L 2250/24; B60L 2250/28;
              (Continued)

(56) References Cited

U.S. PATENT DOCUMENTS

| | | | |
|---|---|---|---|
| 2017/0203750 A1 | 7/2017 | Kawamoto et al. | |
| 2021/0229550 A1 | 7/2021 | Isami | |

(Continued)

FOREIGN PATENT DOCUMENTS

| | | | |
|---|---|---|---|
| JP | 5-332443 A | 12/1993 | |
| JP | 10-103506 A | 4/1998 | |

(Continued)

OTHER PUBLICATIONS

English translation of Tabata et al. (JP H05332443) (Year: 1993).*

(Continued)

*Primary Examiner* — Kyle J Kingsland
(74) *Attorney, Agent, or Firm* — Sughrue Mion, PLLC

(57) ABSTRACT

A battery electric vehicle includes: an accelerator pedal; a shifter; a mode selection device that selects a control mode for an electric motor from a manual mode and an automatic mode in accordance with a mode selection operation by a driver; and a motor control device. The motor control device varies an output characteristic of the electric motor for an operation of the accelerator pedal in accordance with an operation position of the shifter in the manual mode. The motor control device varies an output of the electric motor in accordance with the operation of the accelerator pedal, irrespective of the operation position of the shifter, in the automatic mode. When ACC is requested during control in the manual mode, the motor control device switches control for the electric motor from the manual mode to the automatic mode.

3 Claims, 6 Drawing Sheets

(52) U.S. Cl.
CPC ....... *B60L 2240/12* (2013.01); *B60L 2250/24*
(2013.01); *B60L 2250/28* (2013.01); *B60L*
*2260/20* (2013.01)

(58) Field of Classification Search
CPC .... B60L 2260/20; B60L 2210/40; B60L 7/14;
B60L 15/2009; B60L 2240/421; B60L
2240/461; B60L 2250/26; B60L 2260/26;
B60L 2240/423; B60L 2240/486; B60L
2260/30; B60L 15/2054; B60L 15/20;
B60K 31/00; B60W 30/14; B60W 10/10
See application file for complete search history.

(56) References Cited

U.S. PATENT DOCUMENTS

| | | |
|---|---|---|
| 2022/0041062 A1 | 2/2022 | Nishimine et al. |
| 2022/0041066 A1 | 2/2022 | Isami et al. |
| 2022/0041070 A1 | 2/2022 | Isami et al. |

FOREIGN PATENT DOCUMENTS

| | | | |
|---|---|---|---|
| JP | H1175302 A | * | 3/1999 |
| JP | 2016094157 A | | 5/2016 |
| JP | 2017052378 A | | 3/2017 |
| JP | 2017202756 A | | 11/2017 |
| JP | 2019-64328 A | | 4/2019 |
| JP | 6720685 B2 | | 7/2020 |
| JP | 2020-156260 A | | 9/2020 |
| JP | 2021-118569 A | | 8/2021 |
| JP | 2022-34647 A | | 3/2022 |
| JP | 2022-36845 A | | 3/2022 |
| JP | 7326799 B2 | | 8/2023 |
| WO | 2008/111478 A1 | | 9/2008 |
| WO | 2016013238 A1 | | 1/2016 |

OTHER PUBLICATIONS

English translation of Takigashira et al. (JP-H1175302) (Year: 1999).*
English translation of Yamamoto et al. (JP-H10103506) (Year: 1998).*

* cited by examiner

BATTERY ELECTRIC VEHICLE

CROSS-REFERENCE TO RELATED APPLICATION

This application claims priority to Japanese Patent Application No. 2023-010408 filed on Jan. 26, 2023, incorporated herein by reference in its entirety.

BACKGROUND

1. Technical Field

The present disclosure relates to a battery electric vehicle that uses an electric motor as a power device for travel.

2. Description of Related Art

Japanese Unexamined Patent Application Publication No. 2021-118569 (JP 2021-118569 A) discloses a battery electric vehicle in which a manual shifting operation of a manual transmission vehicle (hereinafter referred to as an "MT vehicle") can be simulatively reproduced by controlling a motor torque.

SUMMARY

Auto cruise control (also referred to as "adaptive cruise control") is known as a function of automobiles, including battery electric vehicles. In the battery electric vehicle described in JP 2021-118569 A, however, the vehicle speed is limited according to an operation position of a shift device during manual shifting operation. Therefore, the function of the auto cruise control is hindered.

The present disclosure suppresses the function of auto cruise control being hindered while making it possible to enjoy driving like an MT vehicle in a battery electric vehicle.

An aspect of the present disclosure relates to a battery electric vehicle including: an electric motor that is a power device for travel; an accelerator pedal; a shifter; a mode selection device; an auto cruise control device; and a motor control device that controls the electric motor. The mode selection device selects a control mode for the electric motor from a manual mode and an automatic mode in accordance with a mode selection operation by a driver. The auto cruise control device executes auto cruise control in response to a request from the driver. The motor control device is configured to vary an output characteristic of the electric motor for an operation of the accelerator pedal in accordance with an operation position of the shifter when the electric motor is controlled in the manual mode. Further, the motor control device is configured to vary an output of the electric motor in accordance with the operation of the accelerator pedal, irrespective of the operation position of the shifter, when the electric motor is controlled in the automatic mode. Furthermore, the motor control device is configured to switch control for the electric motor from the manual mode to the automatic mode when the auto cruise control is requested while the electric motor is controlled in the manual mode.

According to the battery electric vehicle of the present disclosure, the driver can vary the output characteristic of the electric motor for the operation of the accelerator pedal according to the operation position of the shifter by selecting the manual mode through the mode selection operation. In other words, the driver can enjoy driving like an MT vehicle by operating the shifter and the accelerator pedal. When there is a request for the auto cruise control during control of the electric motor in the manual mode, control of the electric motor is switched from the manual mode to the automatic mode. In the automatic mode, the electric motor is controlled so as to vary its output according to the operation of the accelerator pedal, irrespective of the operation position of the shifter. Therefore, the vehicle speed is not limited according to the operating position of the shifter, and the function of the auto cruise control is not hindered.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

1. Configuration of Battery Electric Vehicle

Figure 1:
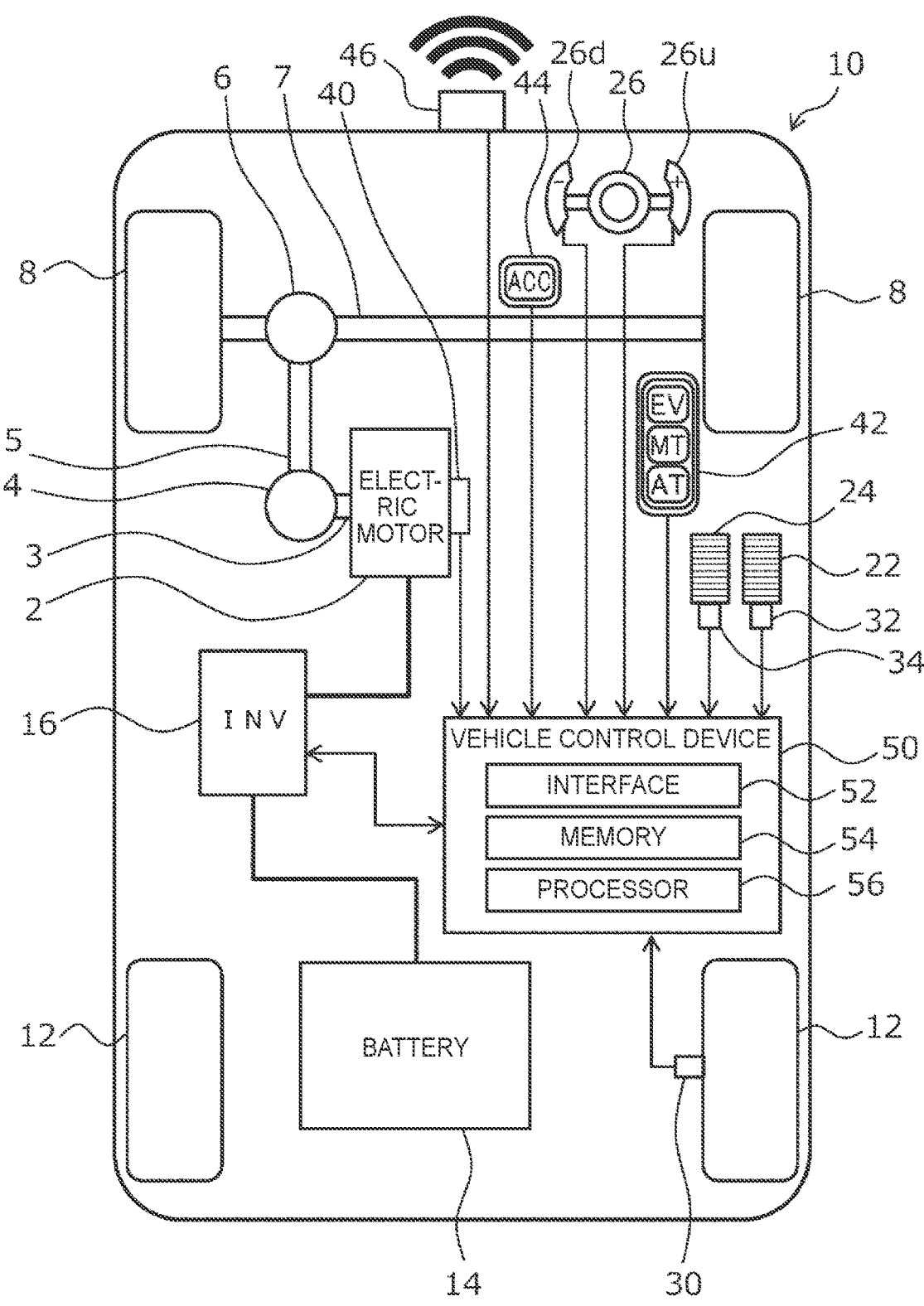
FIG. 1 is a diagram schematically illustrating a configuration of a battery electric vehicle according to an embodiment of the present disclosure.

FIG. 1 is a diagram schematically illustrating a configuration of a power system of a battery electric vehicle 10 according to the present embodiment. As shown in FIG. 1, the battery electric vehicle 10 includes an electric motor 2 as a power device for travel. The electric motor 2 is provided with a rotation speed sensor 40 for detecting the rotation speed of the electric motor 2. An output shaft 3 of the electric motor 2 is connected to one end of a propeller shaft 5 via a gear mechanism 4. The other end of the propeller shaft 5 is connected to a drive shaft 7 on the front side of the vehicle via a differential gear 6. The battery electric vehicle 10 includes drive wheels 8 that are front wheels and driven wheels 12 that are rear wheels. The drive wheels 8 are respectively provided at both ends of the drive shaft 7. Each of the wheels 8 and 12 is provided with a wheel speed sensor 30. Only the wheel speed sensor 30 of the right rear wheel is shown in FIG. 1. The wheel speed sensor 30 is also used as a vehicle speed sensor for detecting the vehicle speed of the battery electric vehicle 10.

The battery electric vehicle 10 is equipped with a battery 14 and an inverter 16. The battery 14 stores electric energy for driving the electric motor 2. That is, the battery electric vehicle 10 is a battery electric vehicle (BEV) that travels with the electric energy stored in the battery 14. The inverter 16 converts direct-current (DC) power input from the battery 14 at the time of acceleration into drive power of the electric motor 2. The inverter 16 converts the regenerative power input from the electric motor 2 at the time of deceleration into DC power to charge the battery 14.

The battery electric vehicle 10 includes an accelerator pedal 22 and a brake pedal 24. A driver inputs an acceleration request for the battery electric vehicle 10 via the accelerator pedal 22. The driver inputs a braking request to the battery electric vehicle 10 via the brake pedal 24. The accelerator pedal 22 is provided with an accelerator position sensor 32 for detecting an accelerator operation amount. The brake pedal 24 is provided with a brake position sensor 34 for detecting a brake depression amount.

The battery electric vehicle 10 further includes a pseudo paddle shifter 26. The pseudo paddle shifter 26 is a dummy different from the original paddle shifter. Generally, an MT vehicle equipped with a paddle shifter is a clutch pedal-free MT vehicle that does not include a clutch pedal. Therefore, the battery electric vehicle 10 is equipped with the pseudo paddle shifter 26. However, the battery electric vehicle 10 does not include a pseudo clutch pedal that resembles a clutch pedal. The pseudo paddle shifter 26 has a structure that resembles a paddle shifter included in a clutch pedal-free MT vehicle. The pseudo paddle shifter 26 is attached to a steering wheel. The pseudo paddle shifter 26 includes an upshift switch 26u and a downshift switch 26d that determine the operation position. The upshift switch 26u issues an upshift signal when pulled toward the driver. The downshift switch 26d issues a downshift signal when pulled toward the driver.

The battery electric vehicle 10 is equipped with a mode selection device 42. The mode selection device 42 is a switch that selects the traveling mode of the battery electric vehicle 10. The traveling modes of the battery electric vehicle 10 include a manual shift mode, an automatic shift mode, and an electric vehicle (EV) mode. The manual shift mode is a control mode for driving the battery electric vehicle 10 in a similar manner to a driving of an MT vehicle. The manual shift mode is programmed to change the output characteristics of the electric motor 2 in response to the operation of the accelerator pedal 22 in accordance with the operation position of the pseudo paddle shifter 26. The automatic shift mode and the EV mode are control modes in which the output of the electric motor 2 is changed in accordance with the operation of the accelerator pedal 22, regardless of the operation position of the pseudo paddle shifter 26. Specifically, the automatic shift mode is a control mode for driving the battery electric vehicle 10 in a similar manner to an automatic transmission (AT) vehicle equipped with a stepped automatic transmission. The automatic shift mode is programmed to automatically switch between a plurality of output characteristics corresponding to the operation position of the pseudo paddle shifter 26 in accordance with the vehicle speed. The EV mode is a normal control mode for driving the battery electric vehicle 10 as a common battery electric vehicle. The EV mode is programmed to continuously change the output of the electric motor 2 in accordance with the operation of the accelerator pedal 22. The automatic shift mode and the EV mode are collectively referred to as an automatic mode. The automatic shift mode can be referred to as a first automatic mode. The EV mode can be referred to as a second automatic mode. In contrast, the manual shift mode can be referred to as a manual mode.

The battery electric vehicle 10 is equipped with an auto cruise control (ACC) switch 44. The ACC switch 44 is a switch for operating auto cruise control. The battery electric vehicle 10 is an automobile that can be driven using auto cruise control. The battery electric vehicle 10 is equipped with a millimeter wave radar 46 to enable auto cruise control. However, a camera may be provided instead of the millimeter wave radar 46 or together with the millimeter wave radar 46 as a device for detecting the distance between the vehicle and the preceding vehicle.

The battery electric vehicle 10 is equipped with a vehicle control device 50. Sensors mounted on the battery electric vehicle 10 and devices to be controlled are connected to the vehicle control device 50 via an information communication network. The vehicle control device 50 is typically an electronic control unit (ECU) mounted on the battery electric vehicle 10. The vehicle control device 50 may be a combination of a plurality of ECUs. The vehicle control device 50 includes an interface 52, a memory 54, and a processor 56. An in-vehicle network is connected to the interface 52. The memory 54 includes a random access memory (RAM) for temporarily recording data and a read-only memory (ROM) for storing a program executable by the processor 56 and various data related to the program. The program is composed of a plurality of instructions. The processor 56 reads the program and data from the memory 54 to execute them. The processor 56 then generates control signals based on signals obtained from each sensor.

Figure 2:
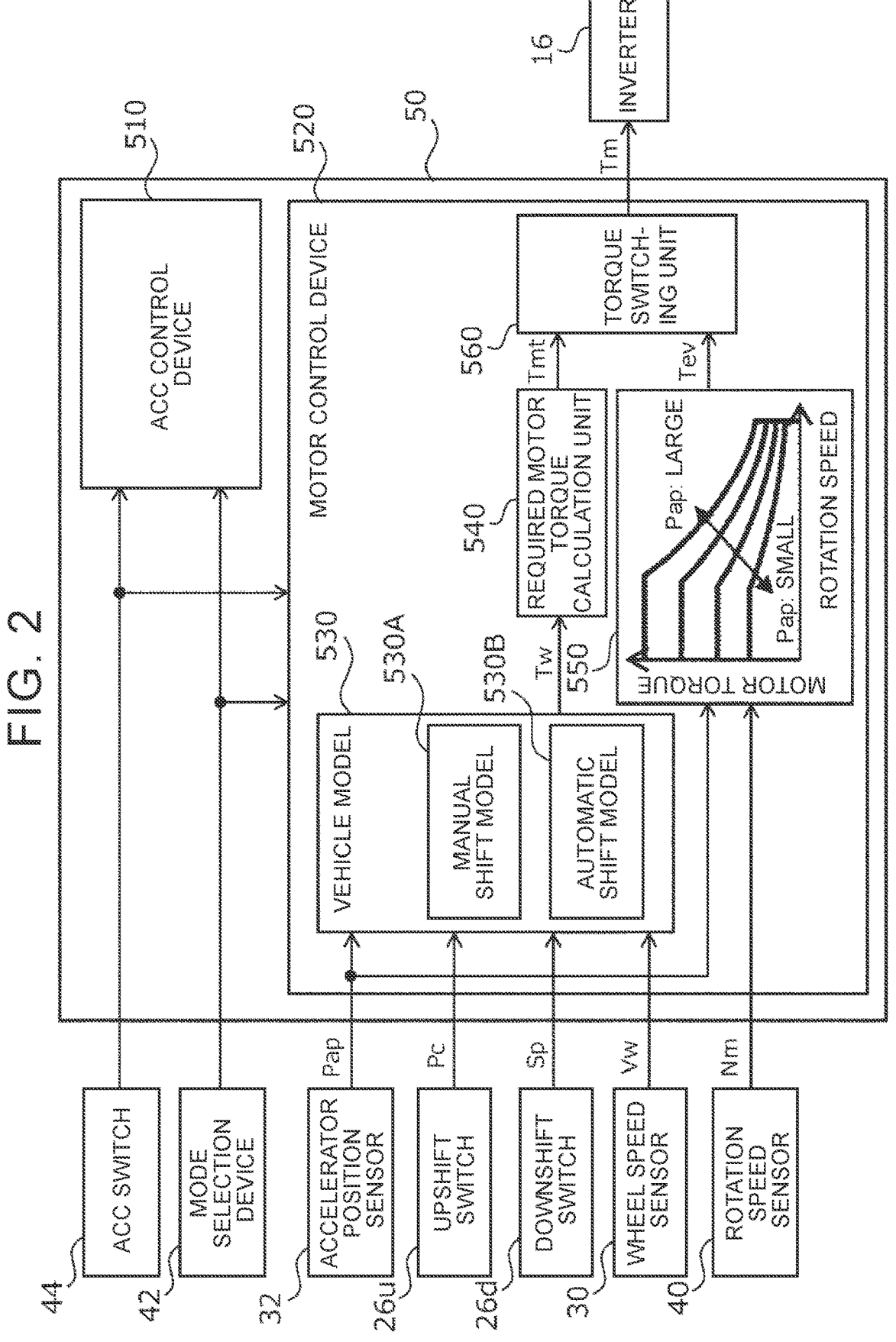
FIG. 2 is a block diagram illustrating a configuration of a vehicle control device of the battery electric vehicle.

FIG. 2 is a block diagram illustrating an example of a configuration of the vehicle control device 50. The vehicle control device 50 includes an ACC control device 510 and a motor control device 520. Specifically, a program stored in the memory 54 is executed by the processor 56. Thereby, the processor 56 functions as at least the ACC control device 510 and the motor control device 520. Hereinafter, each device constituting the vehicle control device 50 will be described.

2. Configuration of Vehicle Control Device 2-1. ACC Control Device

The ACC control device 510 is a device that executes auto cruise control in response to a request from the driver. A signal from the ACC switch 44 is input to the ACC control device 510. When the ACC switch 44 is turned on, the ACC control device 510 uses a signal from the millimeter wave radar 46 to determine the distance to the preceding vehicle. The ACC control device 510 controls the inter-vehicle distance based on the determination result so that the vehicle follows the preceding vehicle within a range that does not exceed the set speed limit. However, in one embodiment, a signal from the mode selection device 42 is input to the ACC control device 510. The signal from the mode selection device 42 is used to switch on/off the auto cruise control in the ACC control device 510. The embodiment will be described later.

2-2. Motor Control Device

The motor control device 520 is a device that controls the electric motor 2 by pulse width modulation (PWM) control of the inverter 16. The motor control device 520 includes a vehicle model 530, a required motor torque calculation unit 540, a motor torque command map 550, and a torque switching unit 560. Signals from the wheel speed sensor 30, the accelerator position sensor 32, the upshift switch 26u, the downshift switch 26d, the rotation speed sensor 40, the mode selection device 42, and the ACC switch 44 are input to the motor control device 520. The motor control device 520 processes these signals and calculates a motor torque command value to perform PWM control on the inverter 16.

There are two types of calculation of the motor torque by the motor control device 520: calculation using the vehicle model 530 and the required motor torque calculation unit 540; and calculation using the motor torque command map 550. The vehicle model 530 and the required motor torque calculation unit 540 are used to calculate the motor torque when the battery electric vehicle 10 is driven in the manual shift mode and the motor torque when the battery electric vehicle 10 is driven in the automatic shift mode. The motor torque command map 550 is used to calculate the motor torque when the battery electric vehicle 10 is driven in the EV mode. The motor torque to be used is determined by the torque switching unit 560.

The vehicle model 530 includes a manual shift model 530A and an automatic shift model 530B. The manual shift model 530A is used when controlling the electric motor 2 in the manual shift mode. The manual shift model 530A is a model that calculates the drive wheel torque that should be obtained by operating the accelerator pedal 22 and the pseudo paddle shifter 26 when the battery electric vehicle 10 is assumed to be an MT vehicle. The automatic shift model 530B is used when controlling the electric motor 2 in the automatic shift mode. The automatic shift model 530B is a model that calculates the drive wheel torque that should be obtained by operating the accelerator pedal 22 when the battery electric vehicle 10 is assumed to be an AT vehicle equipped with a stepped automatic transmission.

Switching between the manual shift model 530A and the automatic shift model 530B in the vehicle model 530 is performed according to a signal from the mode selection device 42. When the manual shift mode is selected by the mode selection device 42, the vehicle model 530 uses the manual shift model 530A. When the automatic shift mode is selected by the mode selection device 42, the vehicle model 530 uses the automatic shift model 530B. However, in one embodiment, a signal from the ACC switch 44 is input to the vehicle model 530. Switching of the model is then performed by inputting an on signal from the ACC switch 44. The embodiment will be described later.

The required motor torque calculation unit 540 converts the drive wheel torque Tw calculated by the vehicle model 530 into a required motor torque Tmt. The required motor torque Tmt is the motor torque required to achieve the drive wheel torque Tw calculated by the vehicle model 530. In order to convert the drive wheel torque Tw into the required motor torque Tmt, a reduction ratio from the output shaft 3 of the electric motor 2 to the drive wheels 8 is used.

The motor torque command map 550 is a map for determining the motor torque from the accelerator operation amount and the rotation speed of the electric motor 2. A signal of the accelerator position sensor 32 and a signal of the rotation speed sensor 40 are input to each parameter of the motor torque command map 550. A motor torque Tev corresponding to these signals is output from the motor torque command map 550. In the EV mode, even when the driver operates the pseudo paddle shifter 26, the operation is not incorporated in the driving of the battery electric vehicle 10.

The torque switching unit 560 switches the connection destination according to the control mode of the electric motor 2. When controlling the electric motor 2 in the EV mode, the torque switching unit 560 is connected to the motor torque command map 550 and outputs the motor torque Tev as the motor torque command value Tm to the inverter 16. When controlling the electric motor 2 in the manual shift mode and the automatic shift mode, the torque switching unit 560 switches the connection destination to the required motor torque calculation unit 540, and outputs the required motor torque Tmt as the motor torque command value Tm to the inverter 16. Switching of the connection destination of the torque switching unit 560 is performed according to a signal from the mode selection device 42. However, in one embodiment, a signal from the ACC switch 44 is input to the torque switching unit 560. Switching of the connection destination is then performed by inputting an on signal from the ACC switch 44. The embodiment will be described later.

Figure 3:
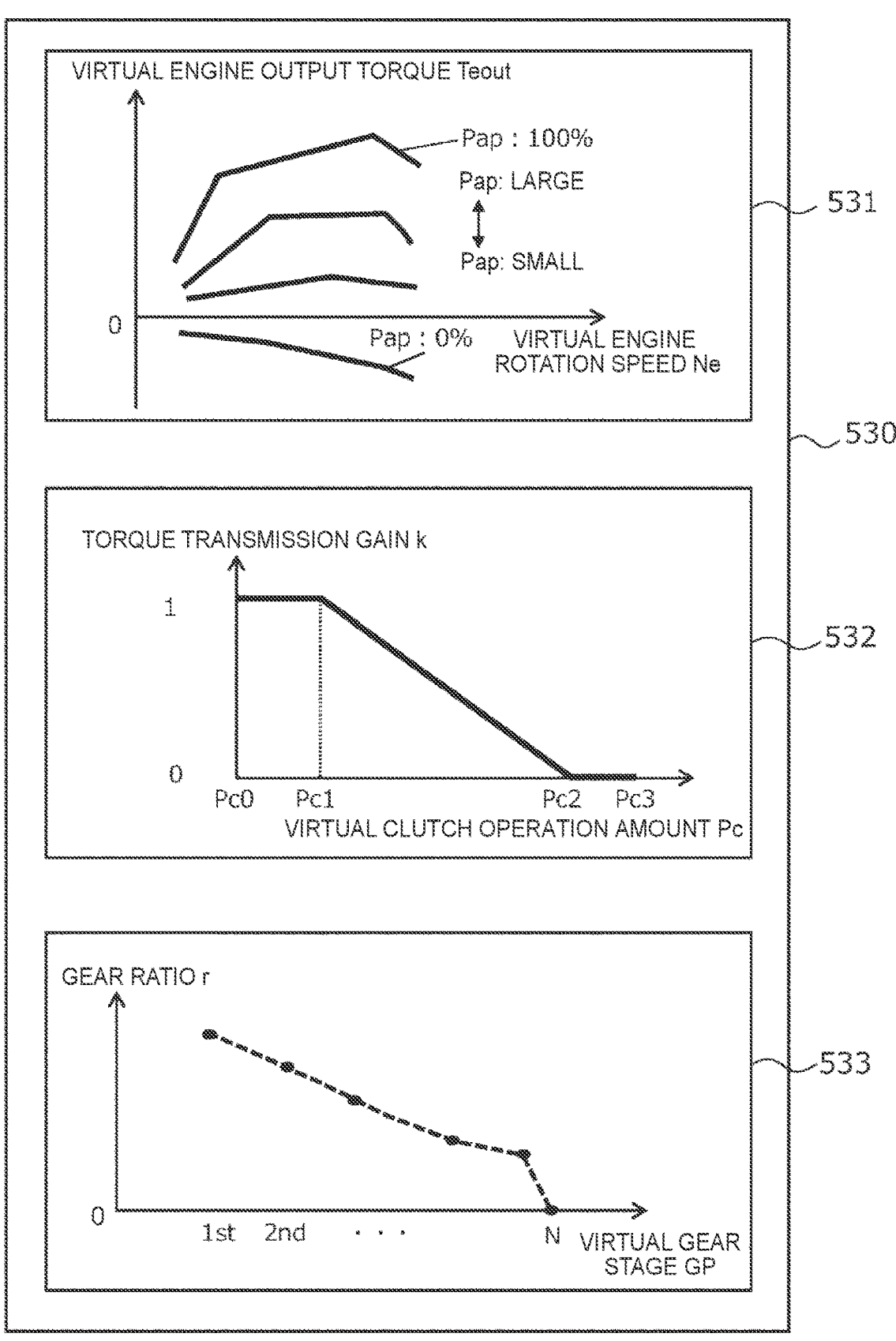
FIG. 3 is a diagram illustrating an engine model, a clutch model, and a transmission model constituting a vehicle model.

Next, the vehicle model 530 will be explained. As shown in FIG. 3, the vehicle model 530 includes an engine model 531, a clutch model 532, and a transmission model 533. These models 531, 532, and 533 are common to the manual shift model 530A and the automatic shift model 530B. Note that the engine, the clutch, and the transmission virtually implemented by the vehicle model 530 are referred to as a virtual engine, a virtual clutch, and a virtual transmission, respectively. In the engine model 531, the virtual engine is modeled. In the clutch model 532, the virtual clutch is modeled. In the transmission model 533, the virtual transmission is modeled.

The vehicle model 530 is calculated by using signals obtained by the sensors. In the calculation of the manual shift model 530A, the engine model 531 uses the accelerator operation amount Pap detected by the accelerator position sensor 32. Further, the upshift signal Su transmitted from the upshift switch 26u and the downshift signal Sd transmitted from the downshift switch 26d are used in the transmission model 533. In the calculation of the automatic shift model 530B, the accelerator operation amount Pap is used in the engine model 531. However, the upshift signal Su and the downshift signal Sd are not used in the calculation of the automatic shift model 530B. The vehicle speed Vw detected by the wheel speed sensor 30 is used in both the calculation of the manual shift model 530A and the calculation of the automatic shift model 530B.

The engine model 531 calculates the virtual engine rotation speed Ne and the virtual engine power torque Teout. The engine model 531 includes a model for calculating the virtual engine rotation speed Ne and a model for calculating the virtual engine output torque Teout. For example, the model represented by the following equation (1) is used to calculate the virtual engine rotation speed Ne. In the following equation (1), the virtual engine rotation speed Ne is calculated from the rotation speed Nw of the wheel 8, the overall reduction ratio R, and the slip ratio Rslip of the virtual clutch.

$$Ne = Nw \times R \times \frac{1}{1 - Rslip} \tag{1}$$

In equation (1), the rotation speed Nw of the wheel 8 is detected by the wheel speed sensor 30. The overall reduction ratio R is calculated from a gear ratio (shift ratio) r calculated by the transmission model 533, which will be described later, and a predetermined reduction ratio. The slip ratio Rslip is calculated by a later-described clutch model 532.

Note that equation (1) is a formula for calculating the virtual engine rotation speed Ne when the virtual engine and the virtual transmission are connected to each other by the virtual clutch. When the virtual clutch is disengaged, the virtual engine torque Te generated in the virtual engine may be considered to be used to increase the virtual engine rotation speed Ne. The virtual engine torque Te is the torque obtained by adding the torque caused by the moment of inertia to the virtual engine output torque Teout. When the virtual clutch is disengaged, the virtual engine output torque Teout is zero. Therefore, when the virtual clutch is disengaged, the engine model 531 calculates the virtual engine rotation speed Ne using the virtual engine torque Te and the moment of inertia J of the virtual engine according to the following equation (2). In calculating the virtual engine torque Te, a map having the accelerator operation amount Pap as a parameter is used.

$$J \times \frac{30}{\pi} \times \frac{d}{dt} Ne = Te \qquad (2)$$

The engine model 531 calculates the virtual engine output torque Teout from the virtual engine rotation speed Ne and the accelerator operation amount Pap. For example, a map as shown in FIG. 3 is used to calculate the virtual engine output torque Teout. This map defines the relation among the accelerator operation amount Pap, the virtual engine rotation speed Ne, and the virtual engine output torque Teout in a steady state. In this map, the virtual engine output torque Teout with respect to the virtual engine rotation speed Ne is given for each accelerator operation amount Pap. The torque characteristic shown in FIG. 3 may be set to characteristics assumed for a gasoline engine, or may be set to character-istics assumed for a diesel engine. It is also possible to set the characteristics assuming a naturally aspirated engine. Furthermore, the characteristics can be set assuming a supercharged engine.

The clutch model 532 calculates the torque transmission gain k. The torque transmission gain k is a gain for calcu-lating the degree of torque transmission of the virtual clutch in accordance with the virtual clutch operation amount. The virtual clutch operation amount is normally 0%. The virtual clutch operation amount is temporarily increased to 100% in conjunction with switching of the virtual gear stage of the virtual transmission. The clutch model 532 has, for example, a map as shown in FIG. 3. In this map, the torque trans-mission gain k is given to the virtual clutch operation amount Pc. In FIG. 3, Pc0 corresponds to a position where the virtual clutch operation amount Pc is 0%. Pc3 corre-sponds to a position where the virtual clutch operation amount Pc is 100%. The range from Pc0 to Pc1 and the range from Pc2 to Pc3 are dead zones in which the torque transmission gain k does not change depending on the virtual clutch operation amount Pc.

The clutch model 532 calculates the clutch output torque Tcout using the torque transmission gain k. The clutch output torque Tcout is torque output from the virtual clutch. For example, the clutch model 532 calculates the clutch output torque Tcout from the virtual engine output torque Teout and the torque transmission gain k by the following equation (3).

$$Tcout = Teout \times k \qquad (3)$$

The clutch model 532 calculates the slip ratio Rslip. The slip ratio Rslip is used to calculate the virtual engine rotation speed Ne in the engine model 531. The slip ratio Rslip can be calculated using a map in which the slip ratio Rslip is given to the virtual clutch operation amount Pc in the same manner as the torque transmission gain k. Instead of such a map, the slip ratio Rslip may be calculated from the torque transmission gain k by the following equation (4) represent-ing the relation between the slip ratio Rslip and the torque transmission gain k.

$$Rslip = 1 - k \qquad (4)$$

The transmission model 533 calculates the gear ratio (shift ratio) r. The gear ratio r is a gear ratio determined by the virtual gear stage GP in the virtual transmission. In the calculation of the manual shift model 530A, the virtual gear stage GP is increased by one stage in response to the input of the upshift signal Su. Upon receiving the input of the downshift signal Sd, the virtual gear stage GP is lowered by one stage. In the calculation of the automatic shift model 530B, the virtual gear stage GP is automatically increased as the vehicle speed Vw increases. The virtual gear stage GP is automatically lowered as the vehicle speed Vw decreases. The transmission model 533 has a map as shown in FIG. 3, for example. In this map, the gear ratio r is given to the virtual gear stage GP. As shown in FIG. 3, the larger the virtual gear stage GP, the smaller the gear ratio r. The transmission model 533 uses the gear ratio r to calculate the transmission output torque Tgout. The transmission output torque Tgout is the torque output from the virtual transmis-sion. For example, the transmission model 533 calculates the transmission output torque Tgout from the clutch output torque Tcout and the gear ratio r by the following equation (5).

$$Tgout = Tcout \times r \qquad (5)$$

As is clear from equation (5), the transmission output torque Tgout changes discontinuously in response to switch-ing of the gear ratio r. This discontinuous change in the transmission output torque Tgout causes a shift shock. This creates the impression of a vehicle equipped with a stepped transmission. However, when calculating the transmission output torque Tgout using the automatic shift model 530B, discontinuities in the transmission output torque Tgout may be suppressed by processing using, for example, a first-order lag filter.

The vehicle model 530 calculates the drive wheel torque Tw using a predetermined reduction ratio rr. The reduction ratio rr is a fixed value determined by the mechanical structure from the virtual transmission to the drive wheels 8. The overall reduction ratio R described above is obtained by multiplying the reduction ratio rr by the gear ratio r. For example, the vehicle model 530 calculates the drive wheel torque Tw from the transmission output torque Tgout and the reduction ratio rr by the following equation (6). The calcu-lated drive wheel torque Tw is output to the required motor torque calculation unit 540.

$$Tw = Tgout \times rr \qquad (6)$$

3. Switching of Control Mode in Conjunction with Auto Cruise Control

According to the above configuration, the driver can select the control mode of the electric motor 2 at his/her discretion. In particular, by selecting the manual shift mode, the driver can enjoy shifting operations similar to those of an MT vehicle. However, in the manual shift mode, the vehicle speed is limited depending on the operation position of the pseudo paddle shifter 26. Thus, when auto cruise control is executed in the manual shift mode, there is a risk that following the preceding vehicle will be hindered. Therefore, when the driver operates the ACC switch 44 to request auto cruise control, the vehicle control device 50 respects the driver's will and executes switching of the control mode so that the auto cruise control function is not inhibited.

Figure 4:
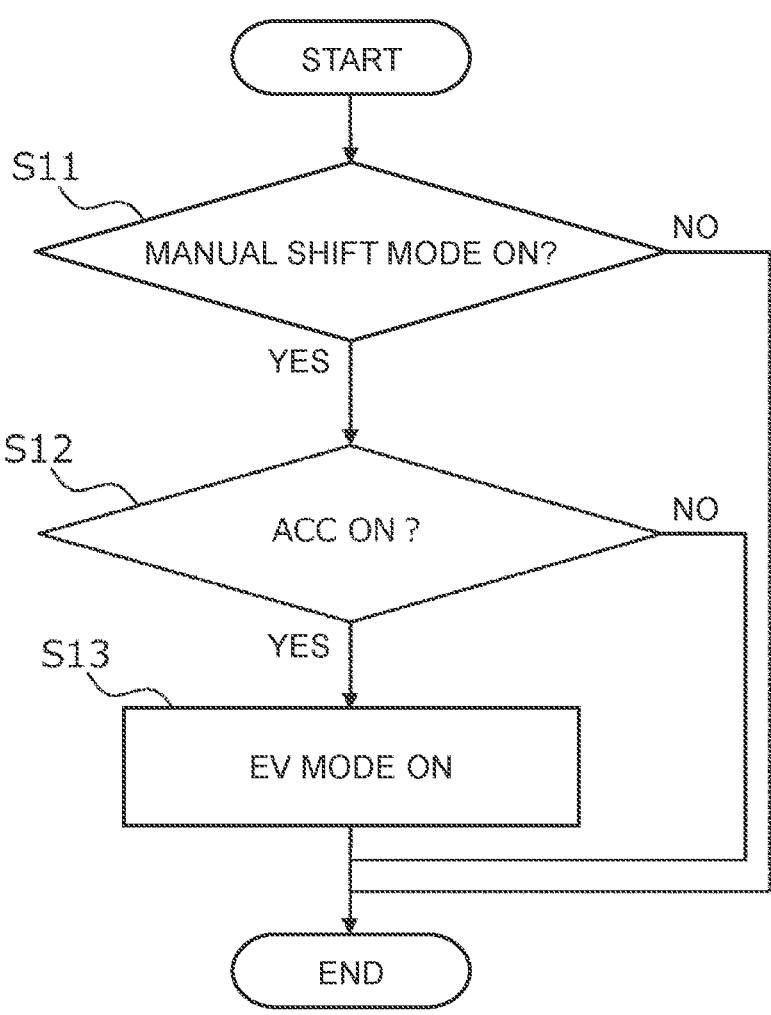
FIG. 4 is a flowchart showing a first embodiment of control mode switching performed in conjunction with auto cruise control.

There are two embodiments for switching the control mode in conjunction with auto cruise control. FIG. 4 is a flowchart showing a first embodiment of the two embodiments. In the first embodiment, first in S11, it is determined whether the current control mode is the manual shift mode. There is no problem in executing auto cruise control unless the current control mode is the manual shift mode. Therefore, when the current control mode is the automatic shift mode or the EV mode, the current control mode is maintained.

When the current control mode is the manual shift mode, it is determined in S12 whether the ACC switch 44 is turned on. When the ACC switch 44 is not turned on, that is, when the driver does not request auto cruise control, there is no problem in continuing the manual shift mode. Therefore, when the ACC switch 44 is turned off, the control mode remains unchanged.

When the current control mode is the manual shift mode and the ACC switch 44 is turned on, the procedure advances to S13. In S13, the control mode is switched from the manual shift mode to the EV mode. Specifically, the connection destination of the torque switching unit 560 is switched from the required motor torque calculation unit 540 to the motor torque command map 550. In the EV mode, the electric motor 2 is controlled to change its output in accordance with the operation of the accelerator pedal 22, regardless of the operation position of the pseudo paddle shifter 26. Therefore, the auto cruise control function is suppressed from being inhibited.

Figure 5:
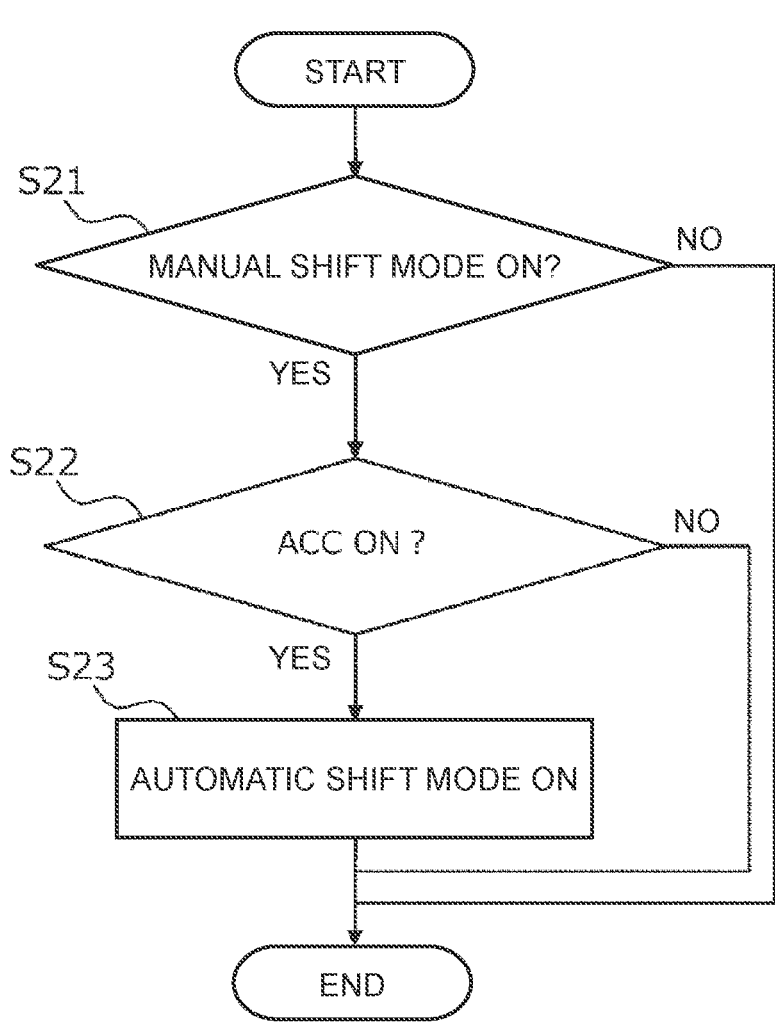
FIG. 5 is a flowchart showing a second embodiment of control mode switching performed in conjunction with auto cruise control.

FIG. 5 is a flowchart showing a second embodiment of the control mode switching performed in conjunction with auto cruise control. In the second embodiment, first in S21, it is determined whether the current control mode is the manual shift mode. When the current control mode is the manual shift mode, it is determined in S22 whether the ACC switch 44 is turned on.

When the current control mode is the manual shift mode and the ACC switch 44 is turned on, the procedure advances to S23. In S23, the control mode is switched from the manual shift mode to the automatic shift mode. Specifically, the calculation in the vehicle model 530 is switched from the manual shift model 530A to the automatic shift model 530B. In the automatic shift mode, the electric motor 2 is controlled to change its output in accordance with the operation of the accelerator pedal 22, regardless of the operation position of the pseudo paddle shifter 26. Therefore, the auto cruise control function is suppressed from being inhibited.

It should be noted that while auto cruise control is being executed, the production of gear change shock in accordance with the switching of the virtual gear stage GP is stopped. That is, during execution of auto cruise control, the transmission output torque Tgout calculated by the transmission model 533 is continuously changed before and after switching the virtual gear stage GP.

4. On/Off Switching of Auto Cruise Control in Conjunction with Mode Switching

While auto cruise control is being executed, selection of the manual shift mode by the mode selection device 42 may be disabled. In other words, only the automatic shift mode or the EV mode may be allowed, giving top priority to making the auto cruise control function. However, on the other hand, when the driver operates the mode selection device 42 to select the manual shift mode, it can also be interpreted as an expression of the driver's intention to enjoy shifting operations similar to those of an MT vehicle.

Figure 6:
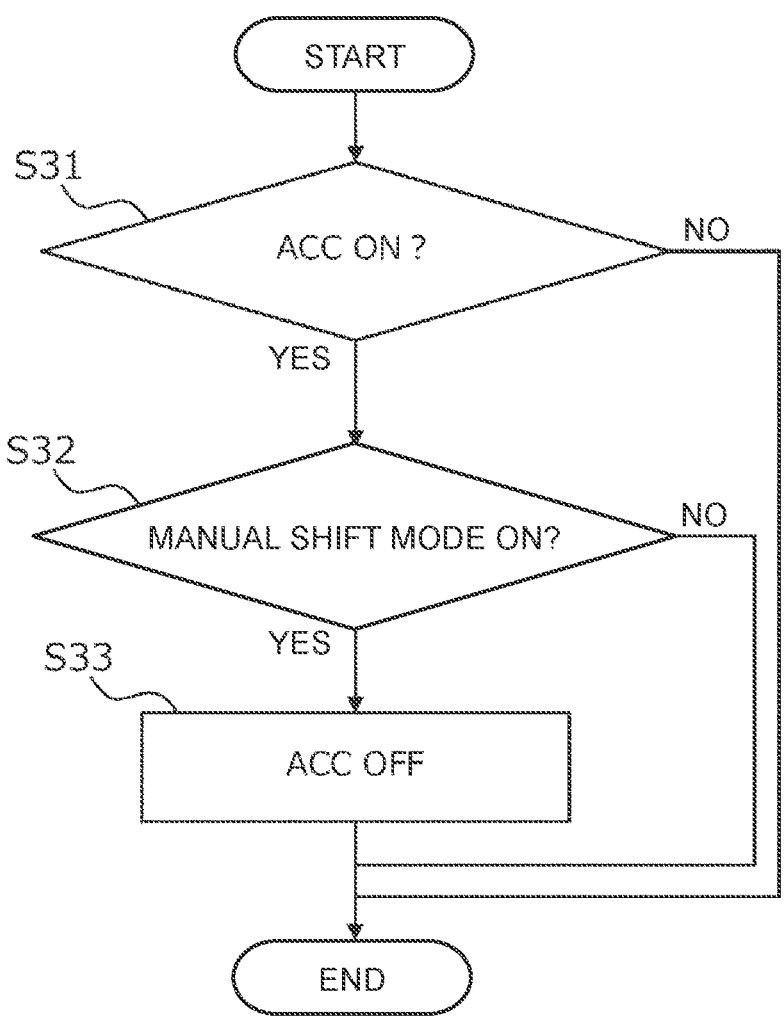
FIG. 6 is a flowchart showing on/off switching of auto cruise control performed in conjunction with mode switching.

FIG. 6 is a flowchart showing on/off switching of auto cruise control in conjunction with mode switching. First, in S31, it is determined whether auto cruise control is currently turned on. As long as auto cruise control is turned off, there is no problem even when the control mode is switched to the manual shift mode. Therefore, when the auto cruise control is currently turned off, auto cruise control remains off.

When auto cruise control is turned on, it is determined in S32 whether the control mode has been switched to the manual shift mode. The auto cruise control function is not inhibited unless the manual shift mode is set. Therefore, when the current control mode is the automatic shift mode or the EV mode, auto cruise control remains on.

When auto cruise control is currently in operation and the control mode is switched to the manual shift mode, the procedure advances to S33. In S33, auto cruise control is switched from on to off. By disabling auto cruise control, the driver can enjoy shifting operations similar to those of an MT vehicle.

4. Others

In the above embodiment, a lever-type pseudo shifter may be provided instead of the paddle-type pseudo shifter. The lever-type pseudo shifter is configured to output an upshift signal by tilting the shift lever forward, and output a downshift signal by tilting the shift lever rearward. Further, in the above embodiment, a pseudo H-type shifter and a pseudo clutch pedal may be provided instead of the pseudo sequential shifter. In that case, in the clutch model of the vehicle model, the torque transmission gain may be calculated in accordance with the amount of depression of the pseudo clutch pedal. Furthermore, in the transmission model of the vehicle model, the gear ratio may be calculated according to the shift position of the pseudo H-type shifter.

What is claimed is:

1. A battery electric vehicle comprising:

an electric motor that is a power device for travel;

an accelerator pedal;

a shifter;

a mode selection device that selects a control mode for the electric motor from a manual mode and an automatic mode in accordance with a mode selection operation by a driver;

an auto cruise control device that executes auto cruise control in response to a request from the driver; and a motor control device that controls the electric motor, wherein the motor control device is configured to vary an output characteristic of the electric motor for an operation of the accelerator pedal in accordance with an operation position of the shifter when the electric motor is controlled in the manual mode, vary an output of the electric motor in accordance with the operation of the accelerator pedal, irrespective of the operation position of the shifter, when the electric motor is controlled in the automatic mode, and switch control for the electric motor from the manual mode to the automatic mode when the auto cruise control is requested while the electric motor is controlled in the manual mode, wherein:

the automatic mode includes a first automatic mode in which switching is automatically made among a plurality of output characteristics corresponding to the operation position of the shifter in accordance with a vehicle speed, and a second automatic mode in which the output of the electric motor is continuously varied in response to the operation of the accelerator pedal;

the mode selection device is configured to be able to select the first automatic mode and the second automatic mode as the automatic mode in accordance with the mode selection operation by the driver; and the motor control device is configured to switch the control for the electric motor from the manual mode to a specific control mode selected from the first automatic mode and the second automatic mode, when the auto cruise control is requested while the electric motor is controlled in the manual mode.

2. The battery electric vehicle according to claim 1, wherein the auto cruise control device is configured to cancel the auto cruise control when the manual mode is selected by the mode selection device during execution of the auto cruise control.

3. The battery electric vehicle according to claim 1, wherein the motor control device is configured to disable selection of the manual mode by the mode selection device during execution of the auto cruise control.

* * * * *